United States Patent
Brooks

[11] 3,907,133
[45] Sept. 23, 1975

[54] BULK CARGO UNLOADING MECHANISM
[75] Inventor: Eugene H. Brooks, Sherman, Tex.
[73] Assignee: Hardwicke-Etter Company, Sherman, Tex.
[22] Filed: Mar. 12, 1974
[21] Appl. No.: 450,344

Related U.S. Application Data
[63] Continuation-in-part of Ser. No. 413,551, Nov. 7, 1973, abandoned.

[52] U.S. Cl. .............. 214/44 B; 212/21; 214/310; 254/147
[51] Int. Cl.² ........................................ B65G 67/24
[58] Field of Search ........ 214/44 R, 44 A, 44 B, 57, 214/64, 17 D, 82, 310; 254/137, 147; 212/18, 21

[56] References Cited
UNITED STATES PATENTS
529,583  11/1894  Beatty ........................... 214/44 B
2,524,189  10/1950  Clay ............................. 212/21 X Primary Examiner—Robert G. Sheridan
Attorney, Agent, or Firm—Bertram H. Mann; Frank B. Pugsley

[57] ABSTRACT

Bulk lading, such as seed cotton, is unloaded from a transport vehicle or a floor or pallet by means of a flexible apron covering the floor or pallet and projecting therefrom, this apron being mechanically pulled upwardly and rearwardly to discharge the load. The unloading movement and repositioning of the apron are accomplished by a single operator utilizing novel mechanical mechanisms.

7 Claims, 13 Drawing Figures

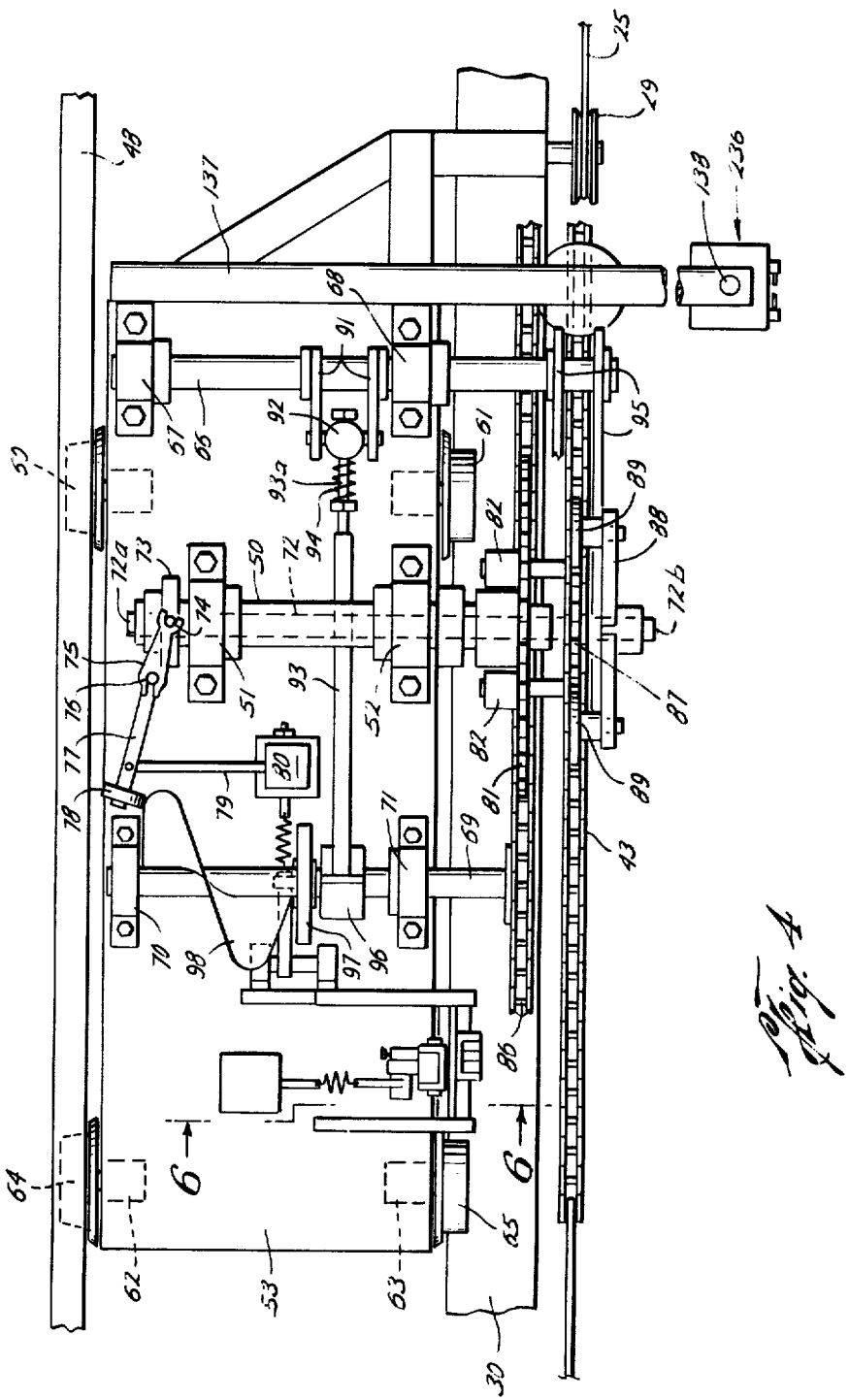

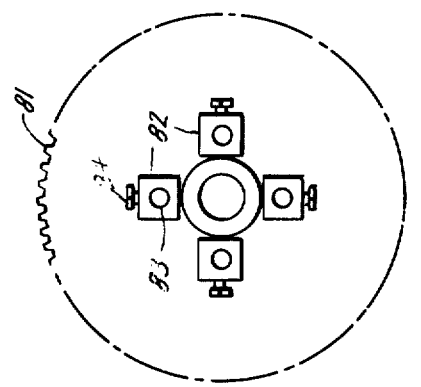
Fig. 9
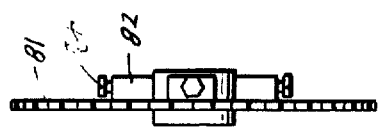
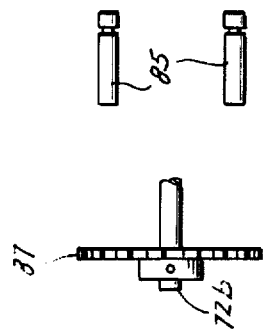
Fig. 7
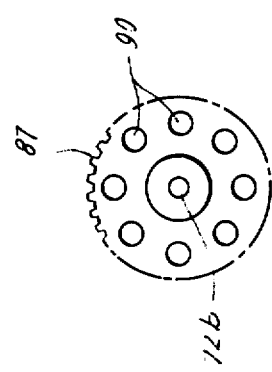
Fig. 8

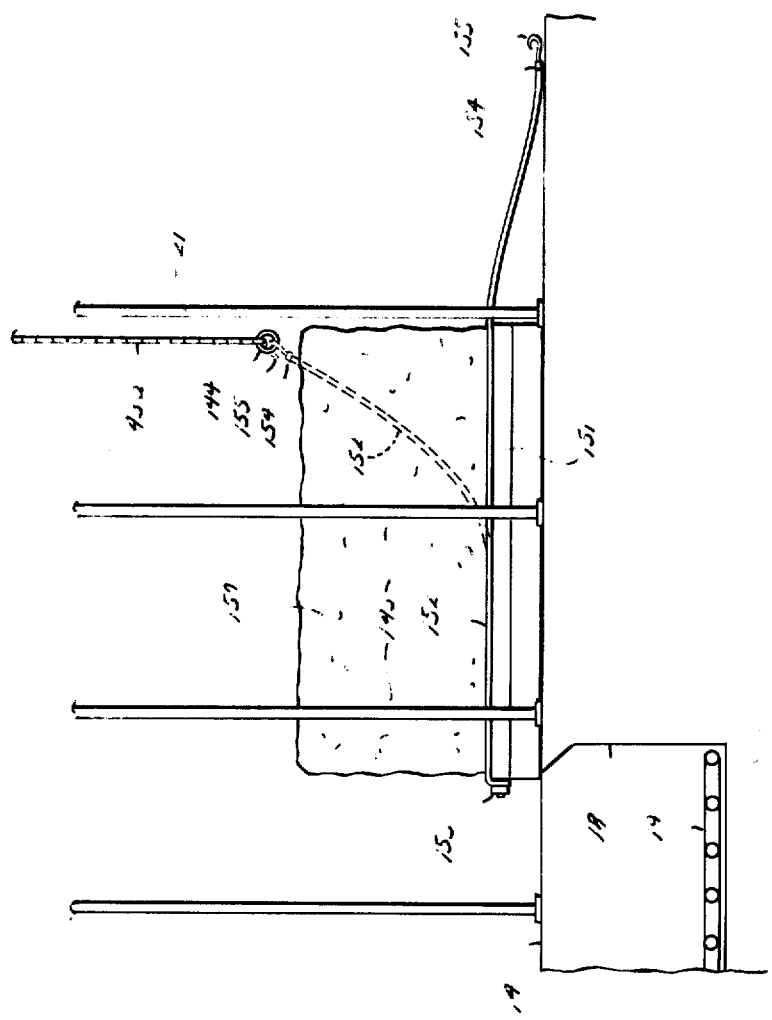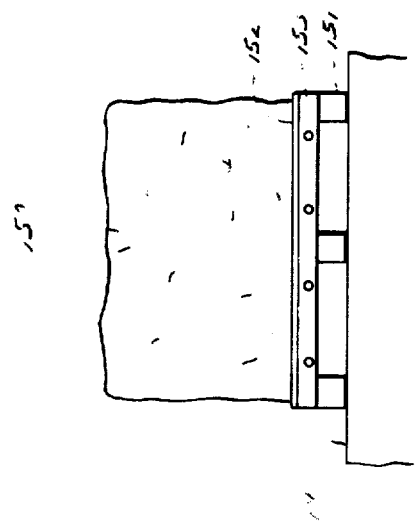

3,907,133

BULK CARGO UNLOADING MECHANISM

RELATED APPLICATION

This application is a continuation-in-part of my co-pending application Ser. No. 413,551 filed Nov. 7, 1973, now abandoned.

BACKGROUND OF THE INVENTION

This invention relates to mechanisms for removing bulk lading, such as seed cotton, from a storage or transport space and consists in novel means whereby a single operator may rapidly, efficiently, and safely effect such removal.

Increased use of mechanical harvesters in the past ten years has greatly reduced the length of the harvest season and increased the rate of flow of seed cotton to the gin. When a producer delivers a load of seed cotton to the gin yard, he wants his trailer emptied promptly so that it can be returned to the field for reloading. To keep abreast of the farmer's production rate, the ginner is constantly improving his plant to increase the efficiency thereof and to eliminate bottlenecks.

Customarily trailer vehicles are used to transport the seed cotton from the farm to the gin plant. There is an economic limit, however, to the number of trailers a cotton producer or ginner can afford, therefore, when available trailers are all filled with seed cotton the harvesting of the cotton must cease or slow down until additional trailers are available. According to a recent development, harvested seed cotton is stacked in the field, as on pallets, and compressed to form compact, weather-resistant modules. In time a transport vehicle carries the module to the gin yard or building which gin plant may be miles from area of production. Thus the harvesting of the cotton can continue at a rate equivalent to the maximum capacity of the harvesting equipment and not dependent upon capacity limitations of the gin plant. Under this system the cotton does not long remain on the stalks in the field and thus a great deal of protection is afforded against weather damage of the fiber.

The increased rate capability of high capacity gin stands has shifted the bottleneck away from the gin to complementary processing and handling equipment. The bottleneck never remains in one location long because of the never-ending struggle of researchers to increase the efficiency of operation and the rate of processing, to reduce cost of operation, and to maintain the inherent quality of the product. Previously, seed cotton trailers have been unloaded by pneumatic systems handling an average of 6,000–8,000 lbs. of seed cotton per hour, or 4–5 bales. The unloading operation and the moving of trailers in the yard required a minimum of two men and the horsepower requirement of the machinery was only 20–30. Today, the unloading system of a modern high-capacity gin plant requires the handling of as much as 20,000–25,000 lbs. of seed cotton per hour, or 15–20 bales. The labor requirement for this unloading and yard operation is a minimum of three to four men. The power requirement ranges, using suction fans, from 65–180 hp depending on plant layout, rated plant capacity, and method of harvest.

In fact, there are plans on the drawing board for the construction in the near future of gin plants capable of processing as much as 60,000 lbs. of seed cotton per hour, or 40 bales. A pneumatic system to handle this volume of material would require two complete and separate unloading systems operating simultaneously to move the mass of seed cotton from the trailer or storage area into the gin building at the required rate. This would double the power and labor requirement for the unloading operation.

Another method of unloading seed cotton involves running the entire loaded trailer into a tunnel-like structure where the trailer is clamped and chained to a revolving section of the machine. The cotton is dumped by revolving the trailer more or less to an upside-down position and permitting the cotton to fall into a pit. While this mechanism functions satisfactorily, the cost of the equipment is very high since not only the dumping mechanism but the trailers themselves must be heavily built to stand the strains and stresses involved in the operation. The time required to clamp and chain the trailer in position is important from a labor standpoint. Moreover, this system is not readily adaptable for handling the pressed modules of seed cotton transported to the gin yard on pallets and unbound.

An object of the present invention is to provide a novel, efficient, high-speed mechanism for unloading seed cotton or like bulk material in a gin yard.

A more specific object is to provide semiautomatic mechanism for moving seed cotton and like materials requiring minimum alteration of existing vehicles or other storage units and the labor of only a single operator.

Another object is to provide such mechanism having substantial versatility, for instance, for handling bulk materials.

SUMMARY OF THE INVENTION

In accordance with the present invention there is provided a support frame extending above a driveway or storage area and having longitudinal and lateral trackways upon which a powered traveller is mounted. The trailer or module pallet to be unloaded is provided with a flexible apron secured to the rear edge of the floor and substantially covering the floor and having a free end extending there-beyond. A traveller, movable along the frame, has a first sprocket drivably engaging the chain portion of a combination cable and chain line extending from a powered winch at the rear end of the frame to a hook at the free, forward edge of the apron for drawing the latter edge upwardly and rearwardly so as to lift and reverse the end of the apron upon itself and discharge the load carried thereon. The traveller is caused to move along the frame by a second sprocket engaging a rack or the like and normally clutched to the first sprocket. As the apron hook reaches the traveller, the two sprockets are unclutched so that the pulling action on the cable thereafter produces only longitudinal movement of the traveller with no lifting effect on the apron header to complete the unloading action. When the mentioned winch is released from its power source, pullback weights reverse the traveller and restore the flexible apron to its original position in the vehicle or on the pallet in the case palletized cotton is being handled.

BRIEF DESCRIPTION OF THE DRAWINGS

In the accompanying drawings which illustrate the invention,

FIG. 4 is a plan view of the structure of FIG. 3.

FIG. 7 is an exploded side view of the traveller driving sprockets and clutch means therefor.

FIG. 8 is a view of the small sprocket taken at 90° to FIG. 7.

FIG. 9 is a view of the large sprocket taken at 90° to FIG. 7.

FIG. 10 is a partial elevation showing an unbound, compressed mass or module of seed cotton on a pallet deposited beneath the unloader.

FIG. 11 is an end view of the module in FIG. 10.

DESCRIPTION OF THE PREFERRED EMBODIMENT

Figure 1:
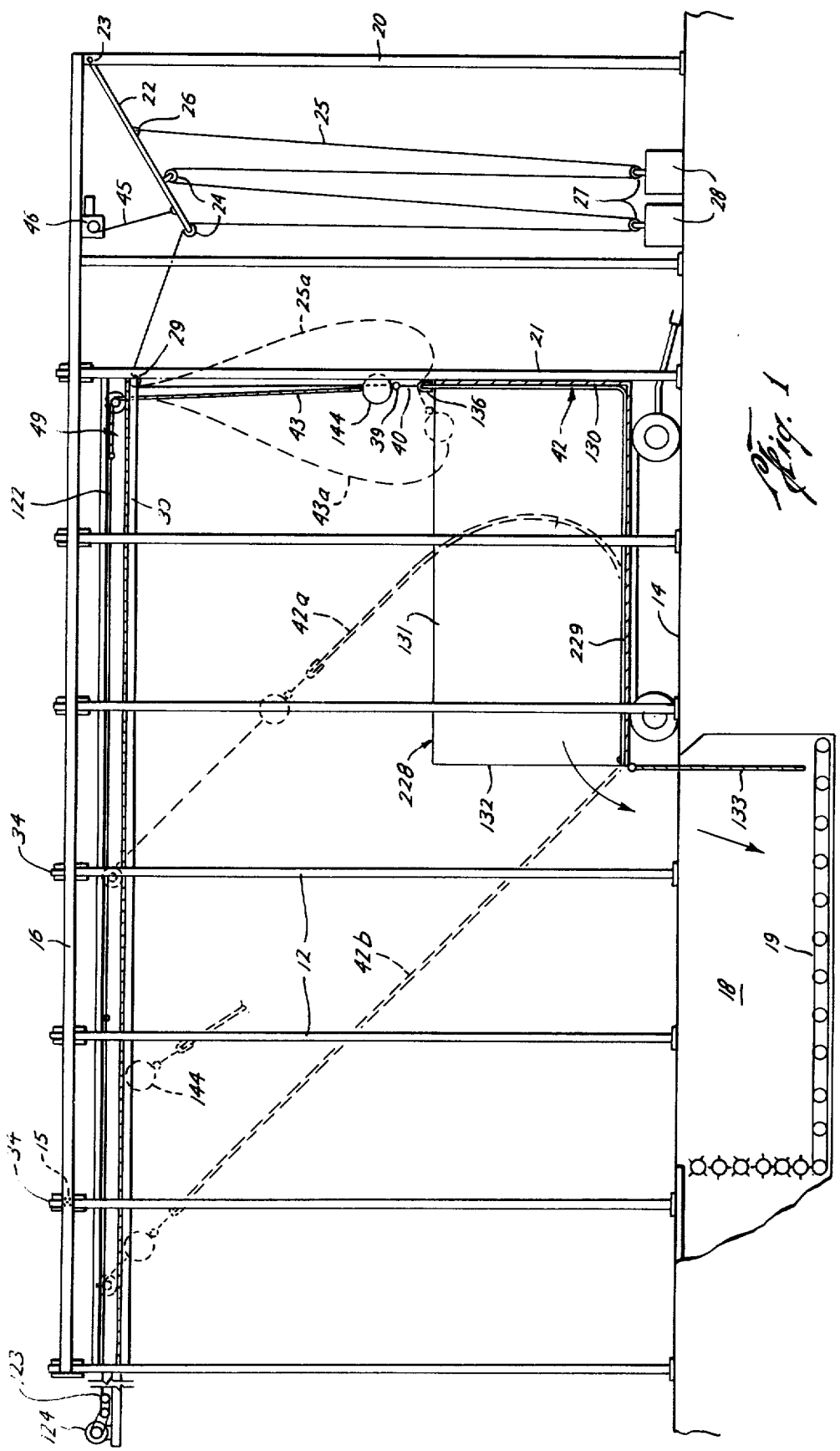
FIG. 1 is a side view of the novel unloading apparatus surmounting a conventional seed cotton trailer.
Figure 2:
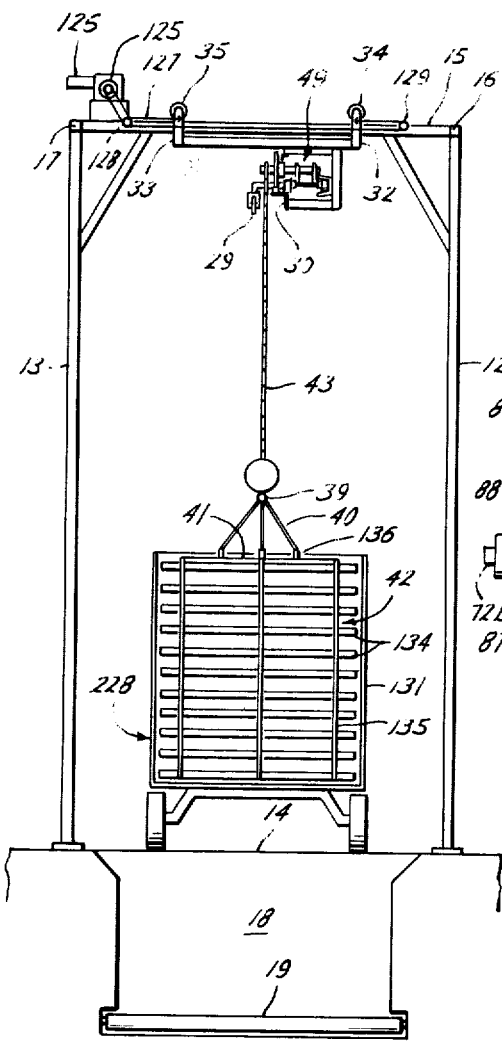
FIG. 2 is a rear end view of the apparatus.
Figure 2A:
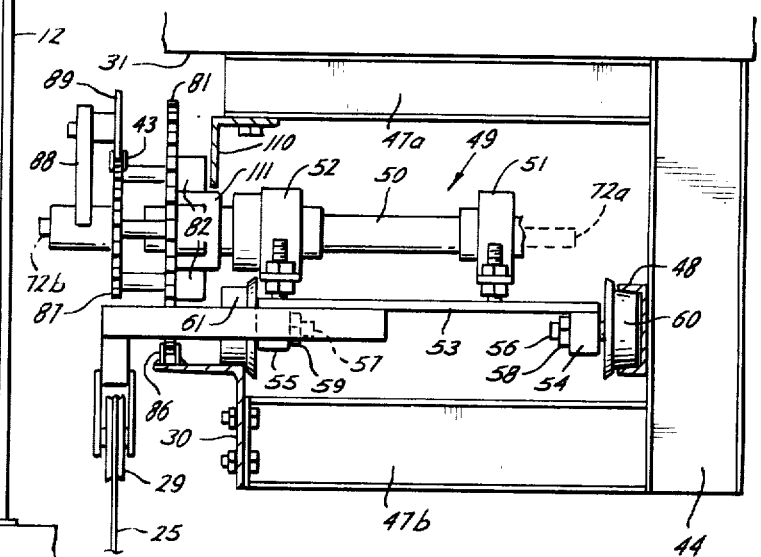
FIG. 2A is an enlargement of the traveller device and tracks of FIG. 2, certain parts being omitted for clarity.
Figure 3:
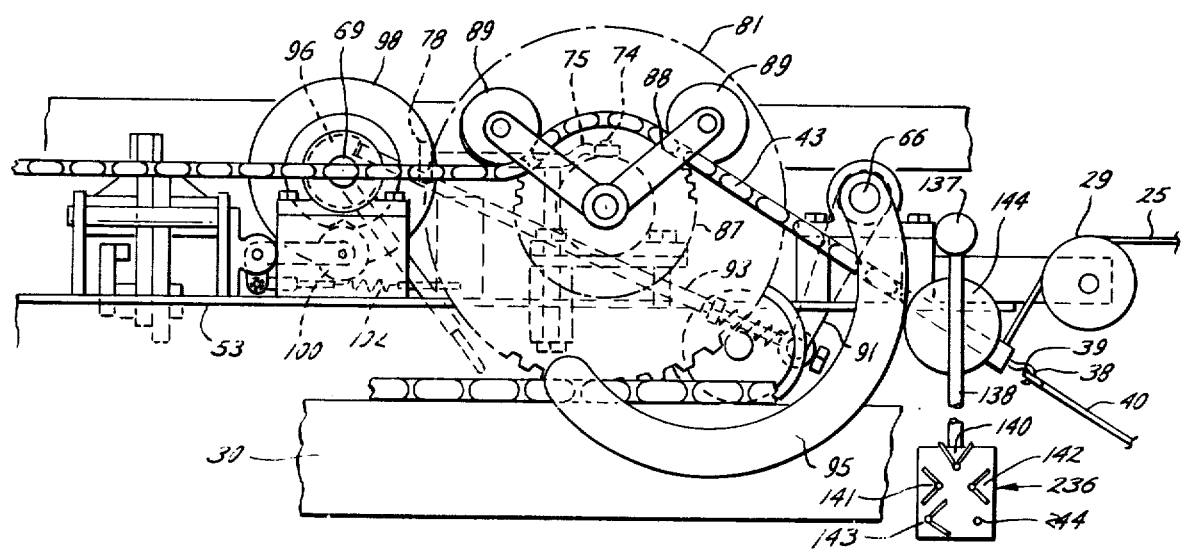
FIG. 3 is an enlarged side view of the traveller.

The main framing shown in FIGS. 1 and 2 comprises vertical side posts 12 and 13 extending from the ground at opposite sides of the driveway 14 and connected at their upper ends by transverse members 15 and longitudinal members 16 and 17. An unloading pit 18 is provided beneath the ground level and is provided with suitable conveyor means 19. At one side of the framing and between foremost vertical post 20 and second rearward post 21 there is provided an equalizing bar 22 pivoted as at 23 to the front post 20. Bar 22 carries a pair of pulleys 24 about which are trained the convolutions of a cable 25 dead-ended to bar 22, as at 26, and intermediately traversing pulleys 27 on a pair of retriever weights 28. Cable 25 extends from the terminal pulley 24 over a pulley 29 at the forward end of the traveller 49 (FIGS. 2A, 3, and 4). The end of cable 25 opposite dead-end 26 is secured to a hook 38 (FIG. 3) for engagement with a ring 39 at the center of a yoke 40 secured centrally to the upper forward edge 41 of a flexible apron, generally designated 42. Also secured to hook 38 is the pull-lift chain 43 to be referred to hereafter. Equalizing bar 22 may be manipulated to handle weights 28 by means of a cable 45 received upon a powered winch 46 secured to a top part of the framing.

As best shown in FIG. 2A, pairs of upper and lower transverse plates 47a and 47b extend between track-forming angle 30 and short vertical posts 44 dependent from auxiliary traveller transverse bars 31. Bars 31 have hangers 32 and 33 at their ends mounting rollers 34 and 35 which ride on frame transverse member 15 to provide transverse movement of the traveller. A track-forming channel 48 is secured to the inner edges of vertical members 44 and extends coextensively with angle track 30 substantially from end to end of the main framing. The carriage or traveller, generally designated 49, has a main cross shaft 50 rotatably supported in journal bearings 51 and 52 secured intermediately to the traveller body plate 53 from which depend additional journal bearings 54 and 55 receiving stub shafts 56 and 57 held in place by nuts 58 and 59. Mounted on the stub shafts opposite the nuts are flanged rollers 60 and 61. Roller 60 is received in and moves along track channel 48, while roller 61 rests on and moves along angle track 30. Main traveller horizontal plate 53 is also secured as by welding to roller journal bearings 62 and 63 (FIG. 4) at the rear end of the traveller. The latter bearings carry stub shafts mounting rollers 64 and 65 also running on tracks 48 and 30. A second cross shaft 66 is supported in journal bearings 67 and 68 secured to traveller plate 53 substantially at the front end thereof, and a third transverse shaft 69 is also mounted on traveller plate 53 by means of journal bearings 70 and 71.

Main cross shaft 50 is hollow and telescopingly receives an inner shaft 72 extending beyond the ends of outer shafts 50, as at 72a and 72b (FIG. 4). Secured to projecting end 72a is a collar 73 (omitted in FIG. 2A) having opposed outward diametral pins 74 engaged by the forked ends of a yoke 75 pivoted on a short shaft 76. Rigid with shaft 76 is an extension arm 77 carrying a cam follower roller 78 at its free end. Arm 77 is connected by a link 79 to a solenoid 80.

At the opposite end of outer cross shaft 50 there is secured a first, larger sprocket 81 having an annular series of bosses 82, each with an aperture 83 extending in an axial direction through the same and through the sprocket web, and set screws 84 (see FIGS. 7, 8, and 9). Normally secured in apertures 83 by means of the set screws 84 are clutch pins 85. Larger sprocket 81 meshes with a chain-rack 86 secured to the upper surface of track angle 30 so that upon rotation of sprocket 81 the traveller will be caused to progress along tracks 40 and 38.

Secured to the corresponding end 72b of the small inner shaft is a second, smaller sprocket 87 which meshes with pull-lift chain 42 extending from the apron. A bell crank 88 is rotatable on shaft end 72b and carries rollers 89 which bear against the chain, as indicated in FIG. 3, so as to cause the chain to be held in full mesh about the sprocket for improving the transmission of driving forces between the chain and sprocket. Rollers 89 contact chain 43 between the slightly raised side plates thereof so as to prevent the bell crank from slipping off shaft end 72b. Small sprocket 87 has an annular series of eight holes 90 (FIG. 8) equally distributed about shaft 72b and the same radial distances therefrom as clutch pins 85. Accordingly, these holes 90 are positioned so that any group of four arranged in quadrature may receive the pins 85 for clutching sprockets 81 and 87 together. The arrangement of inner and outer telescoping shafts 72 and 50, collar 73, and yoke 75, shaft 76, is such that the smaller sprocket 87 will be propelled axially away from larger sprocket 81, upon clockwise rotation of lever 75 and arm 77, so as to withdraw pins 85 from holes 90 in the small sprocket 87, thus disconnecting or unclutching the sprockets. During such unclutching movement, pull-chain 43 will be bowed somewhat outwardly, but not sufficiently to disengage the chain from the sprocket teeth because of the distance from the winch.

Second cross shaft 66 rigidly mounts a pair of depending arms 91 which at their free ends pivotally carry a trunnion 92 through which slides the extremity 93a of a push pin 93 which is urged leftwardly with respect to the trunnion (FIG. 4) by a coiled spring 94. Also rigidly secured to shaft 66 and depending downwardly and rearwardly therefrom adjacent pull-lift chain 43 and on opposite sides of pull-lift chain 43, are relatively long, curved arms 95. These arms are positioned to be engaged by a stop ball 144 at the forward end of pull-lift chain 43 for rotating arms 95 and also shaft 66 and dual arms 91 in the clockwise direction.

Figure 5A:
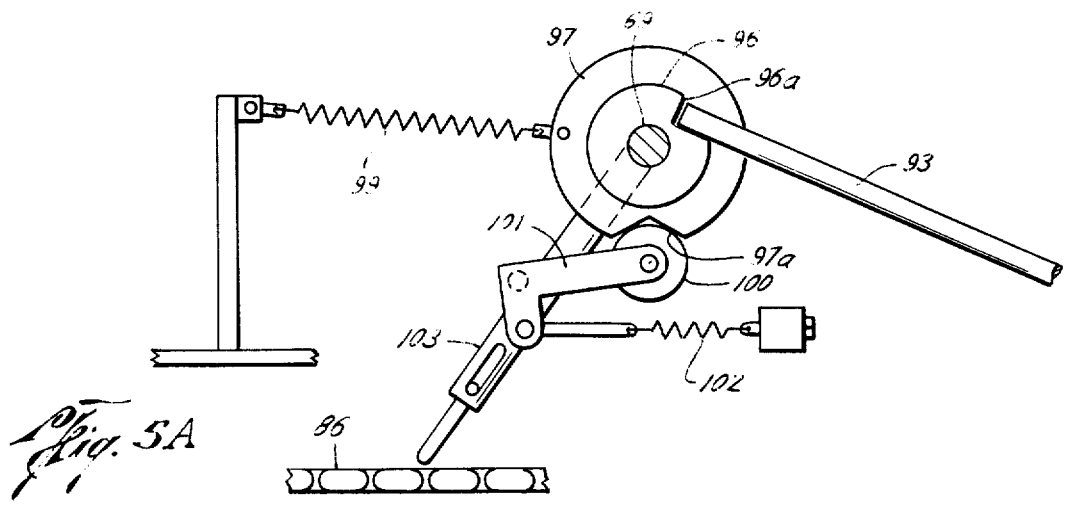
FIGS. 5A and 5B are schematic side views of a portion of the drive chain control mechanism.
Figure 5B:
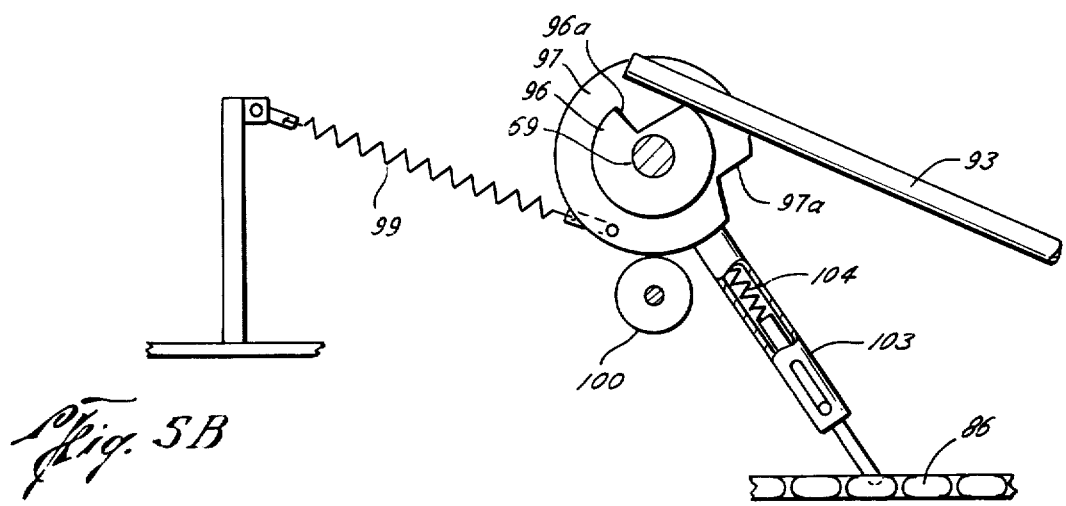

The opposite end of push pin 93 rests on the surface of a notched cam 96, rigid with third cross shaft 69. Also rigid with this third shaft is a detent disk 97 and a screw cam 98 upon which follower roller 78 normally bears. As best shown in FIGS. 5A and 5B, detent disk 97 and cam 96, respectively, have peripheral notches 97a and 96a. Disk 97 is constantly urged toward its stable central position in which the free end of push pin 93 is lodged in notch 96a, by means of a tension spring 99 (FIG. 5A). This position of disk 97 is further stabilized by engagement in notch 97a of a roller 100 carried by a bell crank 101 constantly urged toward the periphery of disk 97, as shown in FIG. 5A, by means of a tension spring 102. Also rigidly secured to shaft 66 and depending therefrom is a collapsible push pin member 103 normally maintained in its expanded condition by means of an internal compression spring 104. FIG. 5A shows these parts in their normal expanded positions, as during the initial rearward or unloading movement of the traveller, with pin 103 carried so that a slight clearance exists between the lower extremity thereof and rack-chain 86. Another function of spring 99 is to provide a means to make sure the lower extremity of pin 103 is contacting the rack-chain 86 during the entire time the traveller is moving toward the winch after the sprockets have been unclutched and the unloading cycle is completed. Positive engagement with chain 86 is necessary to cause collapsible push pin 103 to be returned to the position shown in FIG. 5A when the traveller is returning to the starting position by the retriever weights 28 when the pull winch is reversed.

Figure 6:
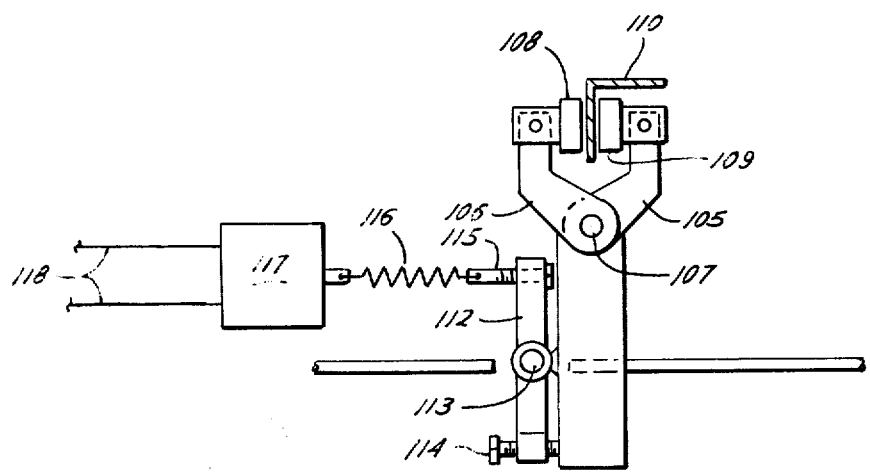
FIG. 6 is a schematic side view of the traveller brake detail.

As will be explained, engagement of stop ball 144 with curved arms 95 will cause sufficient counterclockwise rotation of pin 103 to cause the same to intermesh with chain 86 (FIG. 5A) after which continued rearward motion of the traveller will cause further counterclockwise motion of pin 103 to the position of FIG. 5B. Means for braking the traveller in a fixed position relative to the frame is illustrated in FIG. 6. This consists of a pair of scissors arms 105 and 106 pivotally mounted on a stationary pin 107 and having opposing pads 108, 109 which normally clear the vertical flange of a guide angle 110 substantially above and paralleling track angle 30 and normally spaced slightly above a collar 111 on main cross shaft 50. The main function of this guide angle 110 is to hold main traveller 49 on its tracks 30 and 48. A vertical lever 112 has a central pivotal connection 113 on one of the arms 105, 106 and a screw 114 at one end normally lightly bearing against the other scissors arm 105, 106. An actuating pin 115 at the end of lever 112 opposite the screw 114 is connected by means of a tension spring 116 to the solenoid 117 having control wiring 118 and a control switch 143.

Pull-lift chain 43, forwardly of traveller 49 (FIG. 1), is secured to the end of a rope or cable 122 extending to the rear end of the framing and there wound upon a winch drum 123 powered by a motor 124. This motored winch serves to draw cable 122 and chain 43 rearwardly so as to rotate sprockets 87 and 81 causing sprocket 81 to walk along rackchain 86 and movement of the traveller rearwardly along its tracks 30, 48 at a rate different from the rate of winding up of cable 122, due to the varying sizes of sprockets 81 and 87, as will be explained. In order to properly position hook 38 at the end of chain 43 for catching apron ring 39, the main traveller 49 and its support rails may be bodily shifted laterally of the overhead framing by means of motor 126 and speed reducer 125 upon the output shaft of which is a sprocket for connection to a sprocket on long shaft 128 by a chain. Other sprockets on long shaft 128 (also not shown) are connected by chains, one shown at 127, to idler sprockets 129.

FIGS. 1 and 2 also illustrate a vehicle 228, such as a seed cotton trailer, having a floor 229 and front and side walls 130 and 131. The rear opening 132 may be closed by a door 133 pivoted to the rear edge of floor 129 or otherwise movably secured in position. Apron 42 is shown in solid lines in FIG. 1 covering the floor and front wall of the vehicle and with hooks or other means along its upper forward edge for supporting the apron in this position. At 42a and 42b (FIG. 1) the apron is shown in successive positions during the unloading operation. The apron as shown is formed of closely spaced lateral slats 134 secured together by a plurality of longitudinal straps or cables 135. Yoke 40 is centrally secured to the upper front edge 41 of the apron, for instance, by means of hook devices, as at 136, which also serve to support the front edge of the apron over the front wall 130 of the vehicle. Of course, suitable tracks may be provided for directing the vehicle wheels over unloading pit 18. However, preferably, retriever weights 28 will be positioned at the side or sides of the driveway so that the vehicle may be admitted to the framing from the front end.

For controlling the movement of the carriage or traveller 49 and the adjustment and manipulation of the retriever weights, location of chain hook 38, and lateral adjustment of the traveller assembly, a control box 236 is provided. This box is suspended from a horizontal tube 137 extending from the traveller. At a selected point, depending upon the width of the driveway, a flexible tube 138 hangs down carrying the control box within reach of the operator. A switch 140 controls forward and reverse movement of main pull winch 123. A switch 141 controls the raising and lowering of retriever weight balance bar 22. A switch 142 controls lateral adjustment of the entire traveller assembly. A switch 143 controls the brake (FIG. 6) and a switch 244 controls clutch engagement.

With the traveller located approximately over the forward end of the trailer or end of pallet if modules are being handled and, let's assume, with the retriever weights on the ground, the traveller brake energized, and the sprockets disengaged from the unloading of the previous load, the operation is as follows:

OPERATION

The operator "jogs" the main pull winch, letting out sufficient chain 43, to lower the weight 28, and hook 38, at the same time he lowers retriever weight bar 22, to provide sufficient cable 25, to let weight 144, and hook 38, to reach lifter ring 39 on the trailer apron or to hook 155 in case modules are being handled. He then hooks up the chain 43, and cable 25, to the ring of the apron header. The chain 43 and cable 25 are actually permanently fastened together just below weight 144. At this point the operator observes how much surplus chain 43 exists and, if necessary, "jogs" the winch and/or bar 22 to produce approximately 15 to 20 inches of slack, as at 43a. The slack permits some longitudinal movement of the traveller before any lifting takes place. He then pushes control button 244, drawing clutch sprockets 81 and 87 together in locked position. Next he releases the brake 105, 106, etc., while still holding the sprocket clutch solenoid 80 energized by means of switch 244. Any movement of the traveller permits the clutch pins 85 to find registering holes. Any lateral adjustment necessary to line up the ring 39 and hook 38 if not made previously can be made at this point.

The operator then operates switch 140, putting in motion the main pull winch, and at the same time releases clutch switch button 244. When the load of seed cotton has been dumped, the operator reverses the pull winch. The retriever weights which were lifted during the unloading operation now pull the apron back into the cotton trailer or onto the emptied pallet as the case may be. Through the use of the controls referred to in the previous paragraphs, the operator applies the brake 105, 106, etc., when the traveller reaches the starting point and stops the reversed pull winch when the apron is lowered and ready to be unhooked.

In case of a short trailer, the apron may be fully inverted to the position 42b without de-clutching the sprockets. However, should stop ball 144 reach the traveller (FIG. 3) before full unloading, curved arms 95 will be rocked slightly clockwise, rotating shaft 66 and arms 91 and, by means of the latter, pushing pin 93 to cause slight rotation or notched cam 96 counterclockwise with shaft 69. This causes collapsible push pin 103 to slightly penetrate rackchain 86 (FIG. 3). Thereupon, continued pulling of the cable 122 will continue rearward movement of the traveller to cause pin 103 and, with it, shaft 69 and spiral cam 98, to rotate counterclockwise approximately 70°. This rotation of cam 98 will act through follower 78, yoke 75, and collar 73 to shift internal shaft 72 longitudinally sufficiently to withdraw clutch pins 85 from their holes in small sprocket 87, thus unclutching the sprockets.

Thereafter, cable 122 will continue to wind on winch 123, but without further lifting of the apron, until the apron is fully reversed upon itself and the contents of the trailer or pallet are fully unloaded.

The winch is then reversed, to cause paying out of cable 122 and to permit the retrieval weights to pull the traveller forwardly to the approximate spot where unloading began. Retrieval weight bar 22 will then be lowered, if necessary, to drop the retrieval weights to the ground and to permit weight ball 144 and hook 38 to drop approximately to their apron-hooking positions, paying out of the main winch cable continuing for this purpose. The traveller is then locked in position by means of switch 143 and brake arms 105 and 106.

When another loaded vehicle or pallet is placed under the frame, hook 38 will be manipulated by means of the main and transverse movement motors and the retriever weight bar lowered so that the hook 38 may again engage the apron ring 39 or hook 155 (FIG. 10). The unloading operation may then be repeated, first taking out this slack, then lifting and rearwardly pulling apron ring 39, and finally concluding the rearward movement of the traveller and reversing of the apron, as explained.

FIGS. 10 and 11 show a compressed mass of seed cotton 150 on a pallet 151 constituting a base member deposited on the ground in unloading position beneath the unloader apparatus, only upright side posts 21 and 143 thereof being shown. According to recently developed technique, these modules are formed in the fields and carried by suitable transports to the gin yard, replacing trailers as in FIG. 1. In order to equip the pallet 151 for unloading by my novel apparatus, there is laid on the floor of the pallet a flexible curtain 152 which slightly overlaps the rear end of the floor and is secured thereto, as by a cleat 153. At the front end the curtain, preferably, extends several feet beyond the pallet and at its forward edge has the reinforcing bar 154 with central hook 155.

In use of the novel unloading apparatus with a module positioned as in FIG. 10, hook 39 is lowered and engaged with hook 155 at the free front edge of the curtain. The operator then manipulates the traveller as previously described, to fold the curtain upon itself, thus sliding the cotton mass rearwardly off the pallet and into pit 18, wherein the cotton may be suitably segregated and transported to the driers, cleaners, and distributor. Of course, the lifting action and rearward travel of the traveller will be adjusted in relation to the height and length of the module to provide the desired apron action. For instance, if the quantity of free apron at the front end of the pallet is approximately the same as that required to hook over the front wall of the trailer in FIG. 1, the traveller action can be the same as previously described. Moreover, the pallet may be simply laid on the ground, or on the bottom of chamber beneath the overhead tracks and traveller or repose on the bed of a transporter, with one end secured in place and the other provided with hook 155.

Exclusive use of all modifications as come within the scope of the appended claims is contemplated.

I claim:

1. Unloading apparatus of the type including a frame and an apron with a free edge and a portion for horizontal disposition, in its loading position, for supporting a load beneath said frame, said frame forming an overhead track, a traveller on said track, flexible tension means extending from said traveller for attachment to said free edge, power means on said traveller for propelling said traveller oppositely on said track, and winch means operated by said power means and operatively connected to said tension means for winding and unwinding same whereby upon operation of said power means said free edge may be simultaneously lifted and drawn oppositely across said horizontal portion of said apron for selectively discharging a load on said horizontal portion of said apron and, subsequently, returning said free edge to its loading position.

2. Apparatus as described in claim 1 further including rotary means on said traveller engaging said track and said flexible means for simultaneously lifting said apron and propelling said traveller along said frame.

3. Apparatus as described in claim 2 in which said flexible means has a chain portion and said rotary means has sprocket teeth for cooperating with said chain portion.

4. Apparatus as described in claim 2 further including rack means extending along said track, said rotary means having additional teeth rotatable with said former sprocket teeth and cooperable with said rack means to propel said traveller along said track as said rotary means is rotated by said flexible means.

5. Apparatus as described in claim 2 further including rack means extending along said track and a chain forming said flexible means at least in part, said rotary means including first and second toothed wheels rotatable together and, respectively, cooperating with said chain to rotate said first wheel and with said rack to propel said traveller.

6. Apparatus as described in claim 5 including clutch means for selectively connecting and disconnecting said toothed wheels whereby travel of the traveller may be continued while pulling and paying out of said chain relative to said traveller is discontinued.

7. Unloading apparatus of the type including an overhead frame, a base, and a flexible apron on said base for bearing a load, track means on said frame, a traveller on said track means, rack means extending along said track means, first and second toothed wheels mounted for rotation together on said traveller, said first wheel meshing with said rack means, a chain meshing with said second wheel, a winch secured to said chain for pulling the same to rotate said second wheel, the opposite end of said chain being secured to a free edge of said apron whereby, upon actuation of said winch, said apron is lifted and pulled horizontally and thereby rolled upon itself to discharge a load from said apron.

* * * * *